(12) United States Patent
Urry

(10) Patent No.: US 6,383,674 B1
(45) Date of Patent: May 7, 2002

(54) AIR-ASSISTED ELECTROCHEMICAL CELL CONSTRUCTION

(75) Inventor: Lewis F. Urry, Elyria, OH (US)

(73) Assignee: Eveready Battery Company, Inc., St. Louis, MO (US)

(*) Notice: Subject to any disclaimer, the term of this patent is extended or adjusted under 35 U.S.C. 154(b) by 0 days.

(21) Appl. No.: 09/266,292

(22) Filed: Mar. 11, 1999

(51) Int. Cl.[7] .............................. H01M 4/24; H01M 6/10
(52) U.S. Cl. ......................... 429/27; 429/94; 429/146; 429/224; 429/229
(58) Field of Search ................... 429/94, 129, 131–135, 429/140, 143, 146, 147, 49, 27, 224, 229; 29/623.1

(56) References Cited

U.S. PATENT DOCUMENTS

| | | | |
|---|---|---|---|
| 3,023,258 A | * | 2/1962 | Peters |
| 3,119,722 A | * | 1/1964 | Tietze et al. |
| 3,530,496 A | | 9/1970 | Amano et al. |
| 3,615,858 A | * | 10/1971 | Soto-Krebs |
| 3,970,472 A | | 7/1976 | Steffensen |
| 4,007,059 A | | 2/1977 | Witherspoon et al. |
| 4,011,365 A | * | 3/1977 | Lindstrom |
| 4,076,909 A | | 2/1978 | Lindstrom |
| 4,091,178 A | | 5/1978 | Kordesch |
| 4,226,920 A | | 10/1980 | Armstrong ................ 429/94 |
| 4,431,719 A | * | 2/1984 | Urry |
| 5,079,106 A | | 1/1992 | Urry |
| 5,229,223 A | | 7/1993 | Hyland |
| 5,270,128 A | * | 12/1993 | Reichert et al. |
| 5,318,861 A | | 6/1994 | Harats et al. |
| 5,447,806 A | * | 9/1995 | Hoge et al. |
| 5,569,551 A | | 10/1996 | Pedicini et al. |
| 6,033,795 A | * | 3/2000 | Broussely et al. |

* cited by examiner

Primary Examiner—Gabrielle Brouillette
Assistant Examiner—Susy Tsang
(74) Attorney, Agent, or Firm—Linda Gebauer; Robert W. Welsh

(57) ABSTRACT

An electrochemical cell is disclosed including a cell housing, an ion-permeable, oxygen transmission restricting membrane that divides the interior of the cell housing into a first portion exposed to ambient air and a substantially air-tight second portion, an air electrode provided in contact with the membrane within the first portion of the cell housing interior that reoxidizes when exposed to ambient air, and a working cell provided in the substantially air-tight second portion of the cell housing interior. The working cell includes a positive electrode, a negative electrode, and an electrolyte. The positive electrode is in contact with the membrane and is made of an electrochemically active material that is the same material that is used in the air electrode, such that the air electrode supplies ions to the positive electrode to thereby reoxidize the positive electrode as it discharges without exposing the negative electrode or the positive electrode of the working cell to oxygen from the surrounding air. Also disclosed is a spiral-wound electrode assembly that may be used with or apart from the above electrochemical cell. The spiral-wound electrode assembly includes wound strips of a positive electrode, a negative electrode, and a separator. The spiral-wound electrode assembly further includes a spacer for maintaining a space between the wound strips of negative and positive electrodes for collection and retention of reaction product produced during cell discharge. Preferably, the spacer is formed by alternatingly folded tabs provided along edges of one of the electrode strips.

27 Claims, 2 Drawing Sheets

AIR-ASSISTED ELECTROCHEMICAL CELL CONSTRUCTION

BACKGROUND OF THE INVENTION

The present invention generally relates to electrochemical cells. More particularly, the present invention relates to air-assisted alkaline electrochemical cell constructions.

Conventional alkaline electrochemical cells typically include a positive electrode made of manganese dioxide ($MnO_2$), a negative electrode made of zinc (Zn), and an electrolyte made of potassium hydroxide (KOH) in water. The positive and negative electrodes are separated by a separator layer that electrically insulates the two electrodes, while allowing hydroxyl ions to be transferred via the electrolyte between the positive and negative electrodes. During discharge, the $MnO_2$ positive electrode is reduced and the Zn negative electrode is oxidized in what is commonly known as a redox reaction. Thus, during cell discharge, the peroxidation state of the $MnO_2$ positive electrode is lowered as it gives up oxygen. Because conventional primary alkaline electrochemical cells are closed airtight systems, the cell generally becomes expended once the positive electrode has either donated all its available oxygen or the negative electrode has become completely oxidized. Thus, to maximize the service life of the cell, the amounts of active material for the positive and negative electrodes are balanced typically, such that there is a slight excess of positive electrode active material so that gassing is avoided if the cell is forced into deep discharge.

Significant effort has been made to increase the respective amounts of active material that may be contained within an electrochemical cell without expanding the outer dimensions of the cell beyond accepted standard dimensions. Such efforts, however, have not dramatically increased the service life of a primary alkaline cell. Performance improvements in closed-cell batteries are limited by the fact that the cells are closed and that active materials cannot be fed into the cell. To overcome these limitations, air cells were developed that use air as the positive electrode. Such air cells include openings that enable air to pass into and out of the cell, so that oxygen in the air may be used to electrochemically oxidize the negative electrode, which is commonly made of Zn. While such air cells may include a small amount of $MnO_2$ in the region that is exposed to air, the $MnO_2$ is provided primarily to facilitate the electrochemical oxidation of Zn with the air flowing into the cell. The air electrode also contains a conductive material, which provides a path of electrical conduction from the positive contact terminal of the cell. Due to their extended service life, air cells have found use in devices such as hearing aids or the like in which the voltage and current requirements are relatively low. Such air cells typically exhibit open circuit voltages of 1.05 to 1.4 volts. Typical air cells are provided in a coin cell construction. An example of such an air cell is disclosed in commonly assigned U.S. Pat. No. 5,279,905.

Another type of cell is known as the air-assisted cell. Air-assisted cells differ from air cells in that more $MnO_2$ is provided within the cell, such that the $MnO_2$ rather than the air acts as the positive electrode. The $MnO_2$ positive electrode donates hydroxyl ions to the negative electrode in a manner similar to conventional closed-cell alkaline batteries. The air-assisted cells differ, however, from conventional closed-cell alkaline batteries in that air is allowed to pass into the cell and flow over a portion of the positive electrode, so as to recharge the reduced $MnO_2$ electrode by oxidation and hence restore the peroxidation level of the $MnO_2$ in the positive electrode. Because the $MnO_2$ is replenished by the air entering the cell, the Zn negative electrode is the limiting electrode. To maximize the service life of such air-assisted cells, a significant percentage of the internal volume of the cell that was previously dedicated to $MnO_2$ may now be dedicated to Zn while still providing enough $MnO_2$ to produce pulses of the desired current output levels, where air entry is temporarily inadequate. Examples of air-assisted cells are disclosed in commonly assigned U.S. Pat. Nos. 5,270,128, 5,229,223, and 5,079,106.

A significant shortcoming with respect to both air and air-assisted cells results from the fact that they allow ambient air to enter into and exit from the cell, where not only the positive electrode is located, but also the negative electrode and the electrolyte solution. As a result, the Zn in the negative electrode may be wasted by direct oxidation. Further, the air cells and air-assisted cells typically require special consideration when designing the cell construction, specifically the disposition of the negative and positive electrodes relative to one another and relative to any air openings within the cell.

SUMMARY OF THE INVENTION

Accordingly, it is an aspect of the present invention to solve the above problems by providing an air-assisted electrochemical cell that minimizes the passage of air to the Zn negative electrode. It is another aspect of the present invention to provide an air-assisted electrochemical cell that enables the freedom to arrange the negative and positive electrodes of the cell so as to maximize performance for any given application. Yet another aspect of the present invention is to provide an air-assisted alkaline electrochemical cell whereby the current density per unit area of the negative/positive electrode interface is significantly decreased, thereby reducing the production of undesirable zinc hydroxide-like reaction products within the cell. It is another aspect of the present invention to provide an alkaline cell in which the maximum energy density and the ampere-hour output is significantly increased.

To achieve these and other aspects and advantages, the electrochemical cell constructed in accordance with the present invention comprises a cell housing having a first end including at least one air opening to allow air to enter into a first portion of the cell housing from the surrounding environment; a first positive electrode provided in the first portion of the cell housing and exposed to the air entering the cell housing through the air opening; a second positive electrode disposed in a second portion of the cell housing; a membrane disposed in the cell housing across the first end between the first and second positive electrodes so as to divide the inside of the cell housing into the first and second portions, the membrane being formed of a material capable of absorbing hydroxyl ions and water while restricting oxygen transmission, so as to allow ion and water transport between the first and second positive electrodes and substantially prevent the air entering the first portion of the cell housing from reaching the second portion of the cell housing; a negative electrode disposed in the second portion of the cell housing; and an electrolyte disposed in the second portion of the cell housing.

Still another aspect of the present invention is to provide a spiral-wound electrode assembly for an electrochemical cell that provides space between the positive and negative electrodes for reaction product to be formed and retained. To achieve this and other aspects and advantages, the electrochemical cell according to a second embodiment of the present invention comprises a cell housing and a spiral-wound electrode assembly disposed in the cell housing, including wound strips of a positive electrode, a negative electrode, and a separator. The spiral-wound electrode assembly further includes a spacer for maintaining a space between the wound strips of negative and positive electrodes for collection and retention of reaction product produced during cell discharge.

These and other features, advantages and objects of the present invention will be further understood and appreciated by those skilled in the art by reference to the following specification, claims and appended drawings.

DETAILED DESCRIPTION OF THE PREFERRED EMBODIMENT

Figure 1:
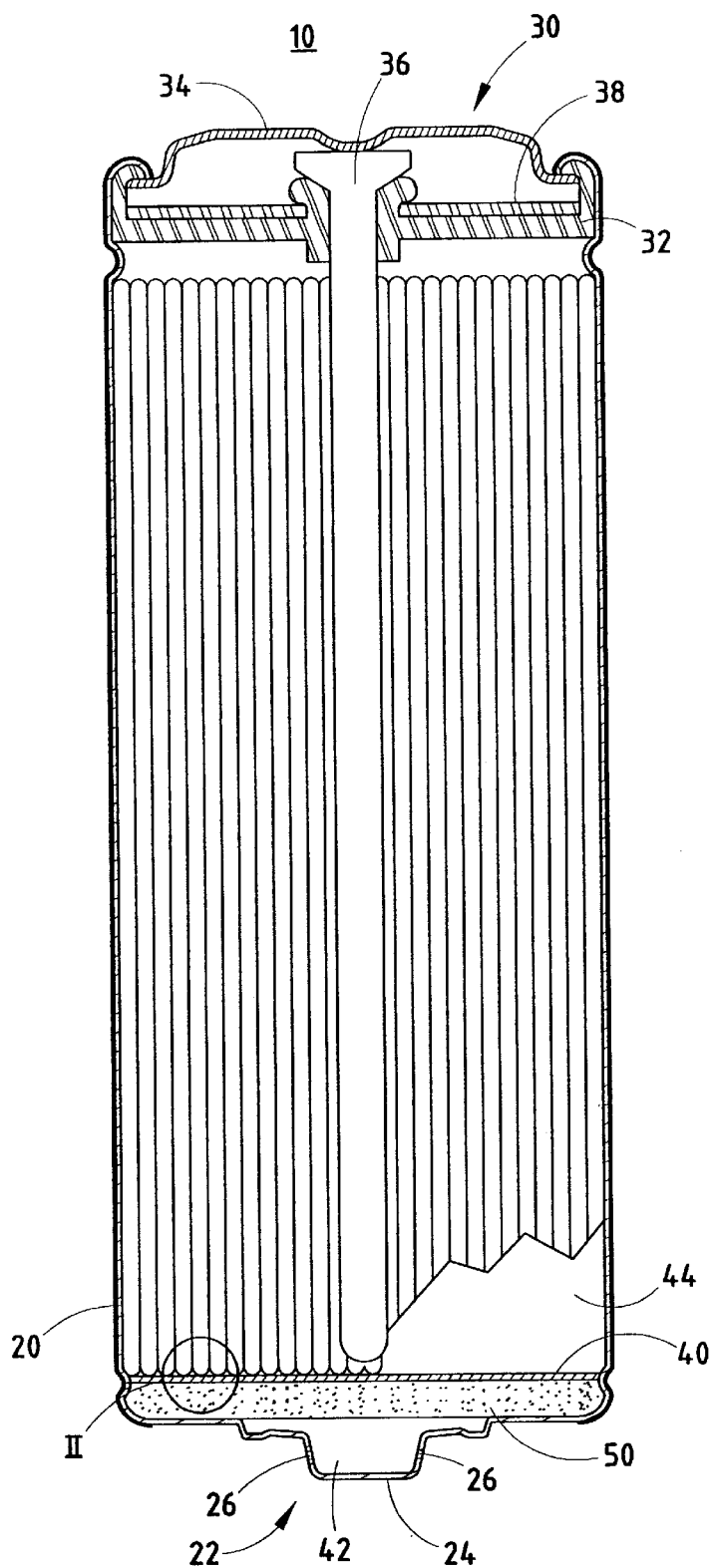
FIG. 1 is a cross-sectional view of an electrochemical cell constructed in accordance with the present invention.

An electrochemical cell constructed in accordance with the present invention is shown in FIG. 1 and designated generally by reference numeral 10. As shown in FIG. 1, electrochemical cell 10 includes a cell housing 20, which is preferably made of an electrically conductive material, such as nickel-plated steel. Cell housing 20 may be generally cylindrical in shape or prismatic. Cell housing 20 includes a closed first end 22 having a protrusion 24 formed therein serving as the external positive contact terminal for the cell. Cell housing 20 also includes at least one air opening 26 for allowing air from the environment surrounding cell 10 to enter into and exit from the interior of cell housing 20. In an alternative embodiment, the closed end of cell housing 20 may be flat, and the external positive contact terminal having a protrusion 24 may be a separate component in electrical contact with cell housing 20. This may be done in order to make the external positive contact terminal from a different material than that of cell housing 20 in order to enhance the appearance and/or electrical contact reliability of the terminal. In such an embodiment, both the closed end of housing 20 and the external contact terminal include at least one air opening.

Cell 10 further includes a negative terminal assembly 30 secured across an open second end of cell housing 20. Negative terminal assembly 30 includes a seal 32, an outer cover 34, and a current collector 36. Negative terminal assembly 30 may also include an inner cover 38 that strengthens terminal assembly 30 and hence provides for a better seal within the open second end of cell housing 20. Seal 32 not only serves to prevent leakage of electrolyte from within cell 20, but also prevents gasses from flowing into or out of this end of cell housing 20. Further, seal 32 electrically insulates outer cover 34 from cell housing 20 so that outer cover 34 may serve as the external negative contact terminal for the cell through physical contact with current collector 36. Negative terminal assembly 30 may take any form conventionally used for electrochemical cells.

Inside of cell housing 20 is provided a membrane 40 that extends radially across the entire inside diameter of housing 20 proximate closed first end 22, so as to divide the inside of cell housing 20 into a first portion 42 and a second portion 44. Membrane 40 is preferably formed of cellophane, cellophane-coated paper, or other similar materials that are permeable to hydroxyl ions and water, but having a very low permeability to oxygen ($O_2$), carbon dioxide ($CO_2$), and other air gasses. Membrane 40 will contain a given amount of electrolyte without allowing the electrolyte to pass therethrough and leak from the cell through air openings 26. Thus, membrane 40 also substantially prevents the air that enters first portion 42 of cell housing 20 through air openings 26 from passing therethrough and entering into second portion 44 in which the working portion of the electrochemical cell (or cell proper) is disposed. The maximum acceptable permeability of membrane 40 to oxygen and other air gases will depend upon how long after activation the cell is expected to last. Preferably membrane 40 will have a low enough oxygen transmission rate that no more than about ⅓ of the negative electrode active material's capacity will be lost as a result of oxygen ingress over a one week period of time, more preferably over a one month period of time, and most preferably over a three month period of time. The oxygen transmission rate through membrane 40 when wetted with electrolyte is preferably no greater than about 0.30 $mg/cm^2/hr.$, more preferable no greater than about 0.07 $mg/cm^2/hr.$, and most preferably no greater than about 0.02 $mg/cm^2/hr.$ Cellophane is an especially well suited material because it absorbs water and electrolyte salt, thereby swelling and becoming a gel. The gel allows ion transport, while effectively retaining water to minimize water loss from the cell. If the membrane is cellophane, the preferred thickness is 1 mil (0.025 mm), if it is cellophane-coated paper, the preferred thickness is 3–4 mils (0.075–0.100 mm). The thickness of the cellophane or cellophane-coated paper will increase when the membrane absorbs electrolyte. Optionally, a sealant, such as asphalt, may be used between the periphery of membrane 40 and cell housing 20.

Electrochemical cell 10 further includes a first positive electrode 50 provided within first portion 42 of cell housing 20 in contact with one side of membrane 40. First electrode 50 includes an oxygen-fixing intermediate material, such as $MnO_2$, silver oxide or nickel oxide. As used herein, an oxygen-fixing intermediate material is an oxide compound which, after having oxygen removed electrochemically, will chemically react with oxygen in the air to replace the lost oxygen, thereby restoring its properties as a depolarizer. The first electrode is preferably formed by coating a metal screen or grid with a mixture including graphite, electrolytic $MnO_2$ (EMD), and a polytetrafluoroethylene (PTFE) binder, such as TEFLON®. This first positive electrode 50, also referred to as an "air electrode," is exposed to air entering openings 26. As will be explained further below, the working cell in second portion 44 includes a second positive electrode 60 (shown in FIG. 2) also including $MnO_2$ that is positioned so as to contact the opposite surface of membrane 40. Both air electrode 50 and positive electrode 60 of the working cell physically contact the inner surface of cell housing 20 so as to be electrically coupled together. Air electrode 50 and positive electrode 60 are also ionically coupled through membrane 40. As will also be explained further below, positive electrode 60 is reduced during cell discharge. Due to the ionic and electrical coupling of positive electrode 60 to air electrode 50, positive electrode 60 draws hydroxyl ions from air electrode 50 through membrane 40 as it gives up the hydroxyl ions to a negative electrode 70 during discharge or rest. Because air electrode 50 is exposed to air entering openings 26, it is continuously reoxidized, thereby replenishing oxygen, in the form of hydroxyl ions, removed therefrom by positive electrode 60. With this construction, positive electrode 60 is continuously reoxidized via air electrode 50 despite the fact that air is not allowed to actually reach positive electrode 60. Accordingly, the interior volume of cell 10 dedicated to positive electrode 60 may be significantly reduced while increasing the volume provided for negative electrode 70 and/or a separator 75 that separates positive electrode 60 from negative electrode 70. As a result, the working cell may be implemented using a wide variety of possible constructions, preferably constructions having high interfacial surface areas, including constructions not previously considered practical.

A preferred working cell construction is to wind positive electrode 60, negative electrode 70, and separator 75 into a spiral-wound electrode assembly (also known as a "jelly roll"). Such spiral-wound electrode assemblies are used in rechargeable and non-rechargeable alkaline and non-alkaline constructions. However, such spiral-wound electrode assemblies have not generally been employed in alkaline $MnO_2$/Zn cells due to the large volume that is required for the layers of separator 75, which must be disposed in all areas in which the negative and positive electrodes interface. For example, in a conventional closed-cell alkaline battery in which the positive electrode is provided in a cylindrical shape and in the outer portion of the battery and the negative electrode and electrolyte are provided in a central separator-lined cavity within the positive electrode, the separator, which is typically about 0.012 inch (0.305 mm) thick, occupies a volume of approximately 6 percent of the internal cell volume. Using conventional separator materials and the same interior cell dimensions, an alkaline cell including a spiral-wound assembly would require that approximately 10 to 20 percent of the internal cell volume be dedicated for the separator. Accordingly, such spiral-wound electrode assemblies would correspondingly reduce the amount of electrochemically active materials that could be provided within the cell. With the present invention, however, the additional volume required for the separator in a cell with a spiral wound electrode assembly can be at least partially offset by a positive electrode of smaller volume. It is preferable to use a thin separator to minimize the volume required for the separator. Cellophane is a preferred separator material. While a 0.002 inch (0.0508 mm) thick cellophane separator may be used, the preferred thickness of a cellophane separator is 0.001 inch (0.0254 mm) or less. Consequently, through the implementation of the air-assisted electrochemical cell of the present invention, a spiral-wound electrode assembly may now be provided in an alkaline cell while significantly increasing its service life.

The provision of a spiral-wound electrode assembly in an alkaline cell provides several advantages. First, the negative/positive electrode interface area is maximized, thereby drastically improving the high-rate performance of the cell compared to a conventional cell with an outer cylindrical cathode. Additionally, the current density per unit area of the negative/positive electrode interface is significantly lowered, thereby improving the electrode volumetric efficiency at a high cell discharge current (e.g., 2 amps or greater). At the lower current densities, foil Zn may be used rather than Zn powder in a gelled electrolyte.

To further improve the performance of the electrochemical cell according to the present invention, a unique spiral-wound electrode assembly was developed that minimizes the volume occupied by the separator and provides void areas between the positive and negative electrodes of the assembly for retention of reaction product, since the volume of the reaction products is greater than that of the reactants. The novel spiral-wound electrode assembly is described below in more detail with further reference to FIG. 2, which is an enlarged view of area II shown in FIG. 1.

Figure 3:
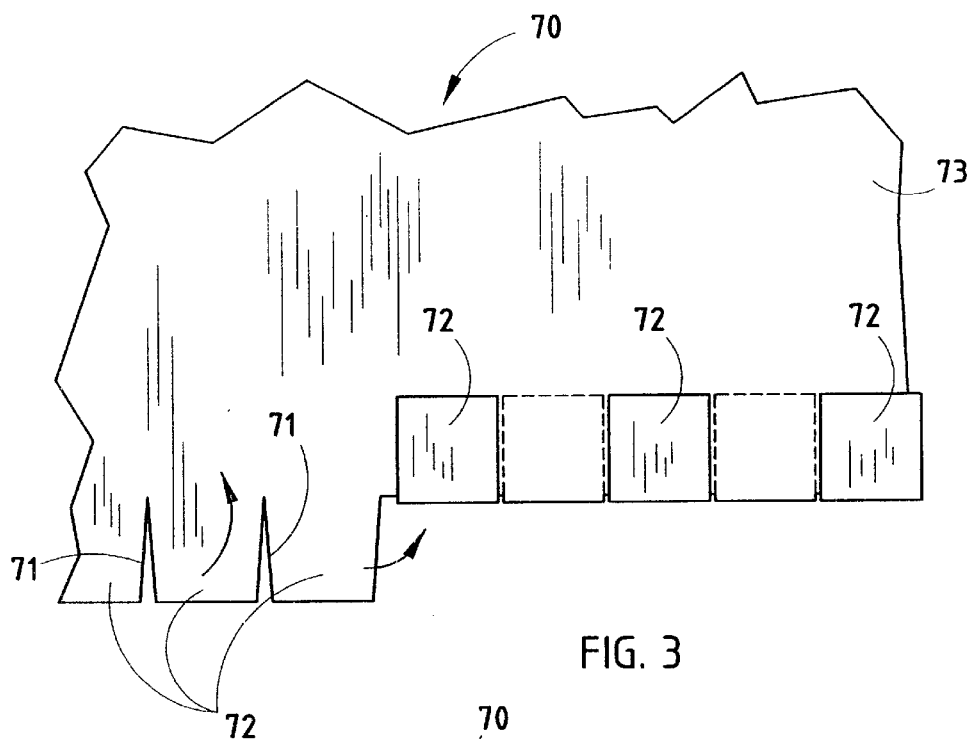
FIG. 3 is a perspective view of a portion of a negative electrode constructed in accordance with the present invention.
Figure 2:
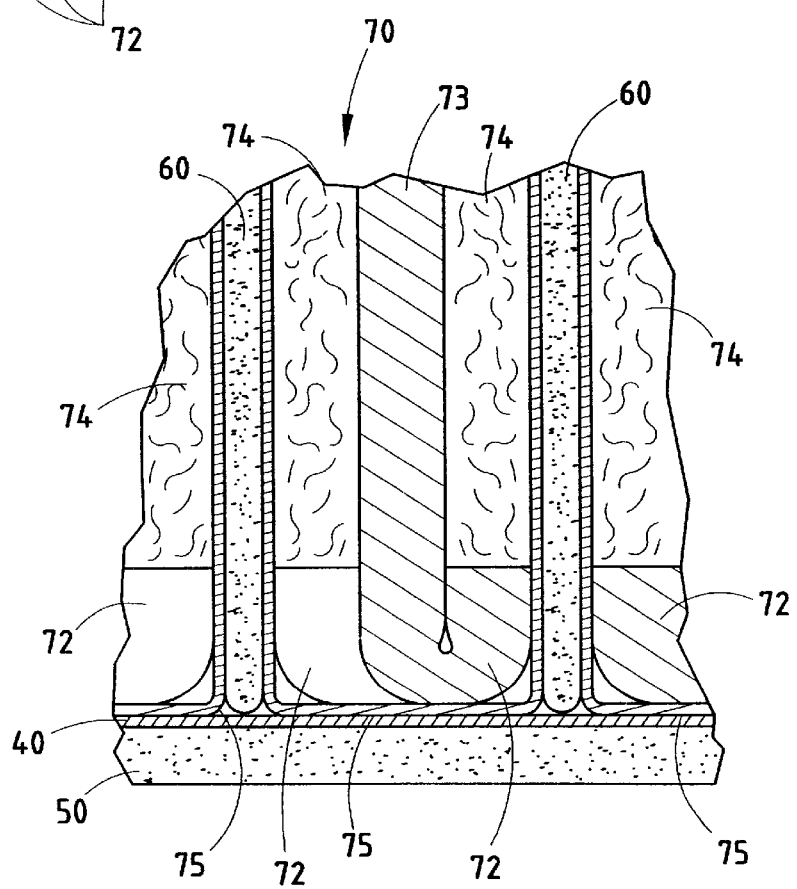
FIG. 2 is an enlarged view of area II shown in FIG. 1.

As shown in FIG. 2, negative electrode 70 is provided in the form of a Zn or Zn alloy foil 73. Zinc foil 73 may have a thickness of approximately 10 mils (0.254 mm). The upper and lower edges of Zn foil 73 include a plurality of spaced vertical cuts or slits 71 (FIG. 3) so as to create a plurality of tabs 72. As best shown in FIG. 3, tabs 72 are alternatingly bent or folded in opposite directions so as to effectively triple the thickness of negative electrode 70 at the top and bottom portions of the spiral-wound electrode assembly. The negative electrode 70, as thus constructed, is inserted into a long tube of cellophane serving as separator 75. Preferably, cellophane separator 75 has a thickness of about 1 to 2 mils (0.0254 to 0.0508 mm). By providing the alternatingly bent tabs 72 along the upper and lower edges of Zn foil 73 and inserting negative electrode 70 into a close-fitting cellophane tube 75, void regions 74 are created between the cellophane 75 and the Zn foil 73. These voids 74 may be filled with an electrolyte solution 76, which preferably includes KOH, water, and either a gelling agent or a very loose, woven felt-like paper to serve as an ion bridge between Zn foil 73 and cellophane separator 75. The folded tabs also serve as an electrically conductive spine that maintains a path of electrical conduction to the collector even as the Zn is consumed during discharge.

Although the present invention has been described above with respect to a cellophane tube used as separator 75, the cellophane may be applied by coating it onto a felted or nonwoven separator paper that is then applied between the positive and negative electrodes. Alternatively, the cellophane could be coated onto both sides of positive electrode 60.

Positive electrode 60 may be formed by coating $MnO_2$ or EMD on a nickel-coated or plain steel thin foil. The $MnO_2$ or EMD is preferably coated on both sides of the foil to provide a positive electrode 60 having a thickness of approximately 5 mils (0.127 mm). The steel foil upon which the $MnO_2$ or EMD is coated preferably has a thickness of between 0.5 and 1.0 mil (0.0127 to 0.0254 mm). Although the ratio of $MnO_2$ to Zn within a cell of the present invention may vary, it is preferable that only enough $MnO_2$ per cell is provided to handle at least one pulse discharge. The $MnO_2$ may then be recharged by the air electrode during a pulse and during a rest period following the pulse.

The positive electrode 60/negative electrode 70/separator structure may then be wound on a mandrel to provide a spiraling structure. For a AA size cell, for example, the resulting structure preferably includes between 13 and 14 wraps, with the positive electrode 60 exposed at the outer surface of the spiral-wound electrode assembly so as to electrically contact the inside of electrically conductive cell housing 20. Current collector 36 is preferably provided in the form of a long pin that extends along almost the entire central axis of cell 10. Pin 36 may be made of any material, such as brass, copper or indium-coated brass or copper, suitable for use in a conventional cell. Collector pin 36, as thus shown, is inserted into the center of the spiral-wound electrode assembly so as to be in physical contact with Zn foil 73 forming negative electrode 70. In this manner, protrusion 24 on the outer surface of cell housing 20 may serve as an external positive contact terminal, while outer cover 34, which is electrically insulated from cell housing 20, may be physically connected to pin 36 and hence serve as the external negative contact terminal for cell 10.

The void area 74 provided between Zn foil 73 and cellophane separator 75 not only provides a reservoir for the electrolyte solution, but also provides an area in which any reaction product may be retained. Voids 74, as described above, are conveniently located for this purpose, since reaction products are generally formed at the positive/negative electrode interfaces.

While void area 74 is shown as being formed by folding tabs 72 created along the edges of Zn foil 73, other spacer means may be utilized to maintain sufficient space between positive electrode 60 and negative electrode 70 to contain the electrolyte and accommodate the formation of any reaction products without creating too much of a gap between the two electrodes. Preferably, the separation between the positive and negative electrodes is no greater than about 10 mils (0.254 mm).

To estimate the performance of an AA size aqueous alkaline $MnO_2/Zn$ cell having the construction shown in FIG. 1 and described above, calculations were made by the following method. For purposes of the calculations, it was assumed that: (1) the positive electrode is made of a 0.001 inch (25.4 $\mu$m) thick steel foil coated on both sides with a 0.0015 inch (38.1 $\mu$m) thick graphite/$MnO_2$ mixture having about 70 volume percent solids bonded to the foil, for a total thickness of 0.004 inch (101.6 $\mu$m), the mixture containing 0.0199 AHrs of $MnO_2$ per square inch based on $MnO_2$ to MnOOH; (2) the separator on each side of the negative electrode is 0.001 inch (25.4 $\mu$m) for a total of 0.002 inch (50.8 $\mu$m); (3) the negative electrode is made of a 0.004 inch (101.6 $\mu$m) thick zinc foil having a capacity per square inch of 0.384 AHrs/sq. inch; and (4) gaps on each side of the zinc foil are 0.004 inch (101.6 $\mu$m) thereby providing about three times the volume of the zinc for the reaction product. The thickness of the zinc foil and the gaps on its sides thus total 0.012 inch (304.8 $\mu$m).

Adding up the thicknesses of one layer of the positive electrode, two layers of the separator, and one layer of the negative electrode (with gaps), the thickness of one wrap of the spiral wound electrode assembly may be calculated as follows:

$$0.003+(0.001\times2)+0.012=0.017 \text{ inch}$$

The volume occupied by one square inch of the spiral wound electrode assembly is thus 0.017 cubic inch per square inch ($in^3/in^2$), which converted to cubic centimeters (cc) per square inch is 0.279 $cc/in^2$ (0.017 $in^3 in^2 \times 16.387$ $cc/in^3$). Based upon the assumption that the capacity of $MnO_2$ (1.0 charge) per square inch of electrode is 0.0199 $AHrs/in^2$, the capacity may be converted to AHrs/cc of the spiral wound electrode by dividing 0.0199 $AHrs/in^2$ by 0.279 $cc/in^2$. Thus, the capacity of $MnO_2$ per cc of electrode is 0.0713 AHrs/cc. Similarly, the capacity of zinc per cc of electrode may be calculated as 1.376 AHrs/cc (0.384 $AHrs/in^2 \div 0.279$ $cc/in^2$). Thus, the capacity of $MnO_2$ is 5.2 percent that of zinc (0.0713/1.376×100 percent).

Assuming the spiral wound electrode assembly has a height of 1.5 inch (38.1 mm) and a central hole with a 0.050 inch (1.27 mm) diameter, the volume of the electrode assembly for a AA size cell would be 5.30 cc (0.323 $in^3$). Because the $MnO_2$ may be recharged as described above, the cell of the present invention is "zinc limited," meaning that the total capacity of the cell is limited to that of the zinc. The capacity of the Zn, and hence that of the inventive alkaline cell, is 7.3 AHrs (1.376 AHrs/cc×5.30 cc). Conversely, conventional alkaline cells are "$MnO_2$ limited," with the total cell capacity of a AA cell being about 2.6 AHrs. Thus, the inventive cell structure provides a very significant 2.8× increase in cell capacity over conventional AA alkaline cells.

As described below, the inventive alkaline cell structure also achieves greatly improved high-rate performance. To determine the increase in the cell's high-rate performance, the positive/negative electrode interfacial area is calculated and compared to that of known alkaline cells. To determine the positive/negative electrode interfacial area, the area of the Zn within the cell is first computed from the capacity of Zn in the cell and the capacity of the Zn per square inch—specifically, 7.3 AHrs/0.384 $AHrs/in^2=19.0$ $in^2$ (122.58 $cm^2$) of Zn in the electrode assembly. Assuming that the Zn foil strip is 1.5 inch high (for a AA size cell), its length is 12.7 inch (19.0/1.5) (32.258 cm). Since there is $MnO_2$ on both sides of the Zn foil, the interfacial area is 38.0 $in^2$ (2×19.0) (245.16 $cm^2$). In a conventional AA alkaline cell, the interfacial area between the positive and negative electrodes is about 1.75 $in^2$ (11.29 $cm^2$). Thus, the interfacial area of the inventive alkaline cell structure is about 22 times greater than that of a conventional cell. Further, a conventional AA alkaline cell has a positive electrode thickness of 0.100 inch (2.54 mm) and a negative electrode thickness of 0.199 inch (5.055 mm) compared to the 0.0015 inch (38.1 $\mu$m) and 0.002 inch (50.8 $\mu$m) thicknesses for the inventive cell structure. Since high-rate performance is a function of interface current density and electrode thicknesses, the alkaline cell of the present invention should have a greatly improved high-rate capability as well as an increased input.

Unlike prior air-assisted cells that utilize an oxygen-permeable membrane between the air openings and the cell to prevent electrolyte from leaking through the air openings, the air-assisted cell of the present invention does not block the flow of air with any such membrane that would possibly impede the flow of air to air electrode 50. Accordingly, unlike prior electrolyte-blocking membranes, membrane 40 may be made from various other materials that also are impervious to oxygen, thereby adding to the flexibility of the cell design.

While the present invention has been described as an alkaline air-assisted cell, certain aspects of the invention may be applied to other types of cells or cell chemistries. For example, the concept of providing reaction product reservoirs between the positive and negative electrodes of a spiral-wound electrode assembly may be employed in any cell using a spiral-wound electrode assembly, such as most rechargeable batteries on the market today. Further, the concept of providing a separate air electrode in a cell and separating the air electrode with an oxygen impervious barrier from another electrode of the same polarity may be employed using various other cell structures other than the disclosed spiral-wound electrode assembly. For example, other cell structures would include a plurality of stacked electrodes, a folded electrode assembly, a "bobbin-style " electrode assembly, etc.

Although the present invention has been described above as utilizing $MnO_2$ as both the cell positive electrode and as the air electrode, the $MnO_2$ cell positive electrode may be replaced with alternative materials that have a voltage that slopes as a function of oxidation state. The air electrode may be made of a material different from the cell positive electrode. The $MnO_2$ in the air electrode described above may be replaced with any material that oxidizes in the presence of air and has a voltage at, or above, the voltage at which a positive electrode material reaches when fully charged. Additionally, although the electrolyte has been described above as being a liquid, the liquid electrolyte may be replaced in whole or in art by a polymer electrolyte.

To maximize the storage life of the cell of the present invention, it may be desirable to cover or block the air entering openings in the cell prior to using the cell. This may be done in any suitable manner using any suitable material that will restrict air and/or moisture from entering or exiting through the holes.

The above description is considered that of the preferred embodiment only. Modifications of the invention will occur to those skilled in the art and to those who make or use the invention. Therefore, it is understood that the embodiment shown in the drawings and described above is merely for illustrative purposes and not intended to limit the scope of the invention, which is defined by the following claims as interpreted according to the principles of patent law, including the doctrine of equivalents.

The invention claimed is:

1. An electrochemical cell comprising:
   a cell housing having a first end including at least one air opening to allow air to enter into a first portion of said cell housing from the surrounding environment;
   a first positive electrode provided in said first portion of said cell housing and exposed to the air entering said cell housing through said air opening;
   a second positive electrode disposed in a second portion of said cell housing;
   a membrane disposed in said cell housing across said first end between said first and second positive electrodes so as to divide the inside of said cell housing into said first and second portions, said membrane being formed of a material capable of absorbing hydroxyl ions and water while restricting oxygen transmission, so as to allow ion and water transport between said first and second positive electrodes and substantially prevent the air entering said first portion of said cell housing from reaching said second portion of said cell housing;
   a negative electrode disposed in said second portion of said cell housing; and
   an electrolyte disposed in said second portion of said cell housing.

2. The electrochemical cell as defined in claim 1 and further including a separator disposed in said second portion of said cell housing and between said second positive electrode and said negative electrode.

3. The electrochemical cell as defined in claim 2, wherein said second positive electrode, said separator, and said negative electrode are provided in a spiral-wound electrode assembly.

4. The electrochemical cell as defined in claim 2, wherein said separator is made of cellophane.

5. The electrochemical cell as defined in claim 1, wherein said membrane comprises cellophane.

6. The electrochemical cell as defined in claim 1, wherein said first positive electrode includes manganese dioxide.

7. The electrochemical cell as defined in claim 1, wherein said second positive electrode includes manganese dioxide.

8. The electrochemical cell as defined in claim 1, wherein said negative electrode includes zinc and/or a zinc alloy.

9. The electrochemical cell as defined in claim 8, wherein said negative electrode includes a zinc and/or zinc alloy foil.

10. The electrochemical cell as defined in claim 1, wherein said negative electrode has an electrochemical capacity, and no more than one third of said capacity is lost as a result of said air entering said first portion of said cell housing reaching said second portion of said cell housing during one week.

11. The electrochemical cell as defined in claim 1, wherein said first positive electrode includes a metal screen and a mixture of electrolytic manganese dioxide and graphite provided on said metal screen.

12. The electrochemical cell as defined in claim 1, wherein said first end of said cell housing comprises a external positive terminal contact with a protrusion formed therein.

13. The electrochemical cell as defined in claim 1, wherein said cell housing is electrically conductive and said first and second positive electrodes are electrically coupled to one another through contact with said cell housing.

14. The electrochemical cell as defined in claim 3, wherein said spiral-wound electrode assembly further includes a spacer for maintaining a space between said wound strips of negative and positive electrodes for collection and retention of reaction product produced during cell discharge.

15. An electrochemical cell comprising:
    a cell housing;
    an ion-permeable, oxygen transmission restricting membrane that divides the interior of said cell housing into a first portion exposed to ambient air and a substantially air-tight second portion;
    an air electrode provided in contact with said membrane within said first portion of said cell housing interior that reoxidizes when exposed to ambient air; and
    a working cell provided in said substantially air-tight second portion of said cell housing interior, said working cell including a positive electrode, a negative electrode, and an electrolyte, said positive electrode being in contact with said membrane and electrically coupled to said air electrode, such that said air electrode supplies ions to said positive electrode and receives electrons from said positive electrode to thereby reoxidize said positive electrode.

16. The electrochemical cell as defined in claim 15, wherein said positive electrode is made of an electrochemically active material that is the same as a material of which said air electrode is made.

17. The electrochemical cell as defined in claim 15, wherein said working cell includes a spiral-wound electrode assembly including wound strips of said positive electrode, said negative electrode, and a separator.

18. The electrochemical cell as defined in claim 17, wherein said spiral-wound electrode assembly further includes a spacer for maintaining a space between said wound strips of negative and positive electrodes for collection and retention of reaction product produced during cell discharge.

19. An electrochemical cell comprising:
    a cell housing; and
    a spiral-wound electrode assembly disposed in said cell housing, including wound strips of a positive electrode, a negative electrode, and a separator, said spiral-wound electrode assembly further including a spacer for maintaining a space between said wound strips of negative and positive electrodes for collection and retention of negative electrode reaction product produced during cell discharge, wherein said spacer is formed by alternatingly folded tabs provided along edges of one of said electrodes.

20. The electrochemical cell as defined in claim 19, and further including electrolyte provided space between said electrodes.

21. An alkaline cell comprising:
    a cell housing;
    a spiral-wound electrode assembly disposed in said cell housing, including wound strips of a positive electrode including manganese dioxide, a negative electrode including zinc, and a separator, said spiral-wound electrode assembly further including a spacer for maintaining a space between said wound strips of negative and positive electrodes for collection and retention of reaction product formed during cell discharge, wherein said spacer is formed by alternatingly folded tabs provided along edges of one of said electrodes.

22. An air-assisted alkaline cell comprising:

a cell housing having at least one air opening through which ambient air may enter the interior of said cell housing;

an ion-permeable, oxygen transmission restricting membrane that divides the interior of said cell housing into a first portion exposed to ambient air entering said air opening and a substantially air-tight second portion;

an air electrode including manganese dioxide provided in contact with said membrane within said first portion of said cell housing interior that reoxidizes when exposed to ambient air; and a spiral-wound electrode assembly provided in said airtight second portion of said cell housing interior, said spiral-wound electrode assembly including wound strips of a positive electrode including manganese dioxide, a negative electrode including zinc, and a separator, said air electrode being ionically coupled to said positive electrode through said membrane so as to supply ions to said positive electrode to thereby reoxidize said positive electrode.

23. The alkaline cell as defined in claim 22, wherein said spiral-wound electrode assembly further including a spacer for maintaining a space between said wound strips of negative and positive electrodes for collection and retention of reaction product formed during cell discharge.

24. The alkaline cell as defined in claim 22, wherein said spacer is formed by alternatingly folded tabs provided along edges of one of said electrodes.

25. The alkaline cell as defined in claim 22, wherein said separator is made of cellophane.

26. The alkaline cell as defined in claim 22, wherein said space is provided between said negative electrode and said separator.

27. The alkaline cell as defined in claim 22, wherein said membrane comprises cellophane.

* * * * *